F. W. WRIGHT.
PROJECTING MACHINE FOR MOVING PICTURES.
APPLICATION FILED NOV. 18, 1911.
1,024,661.
Patented Apr. 30, 1912.
2 SHEETS—SHEET 2.
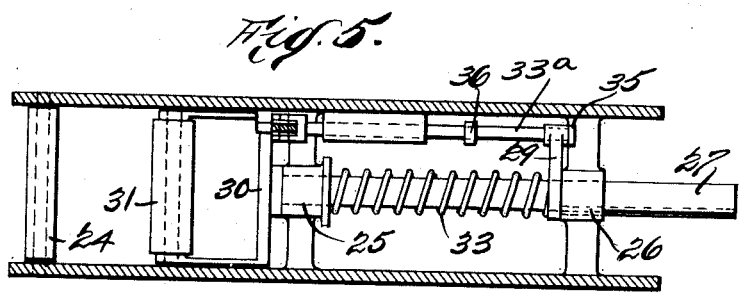
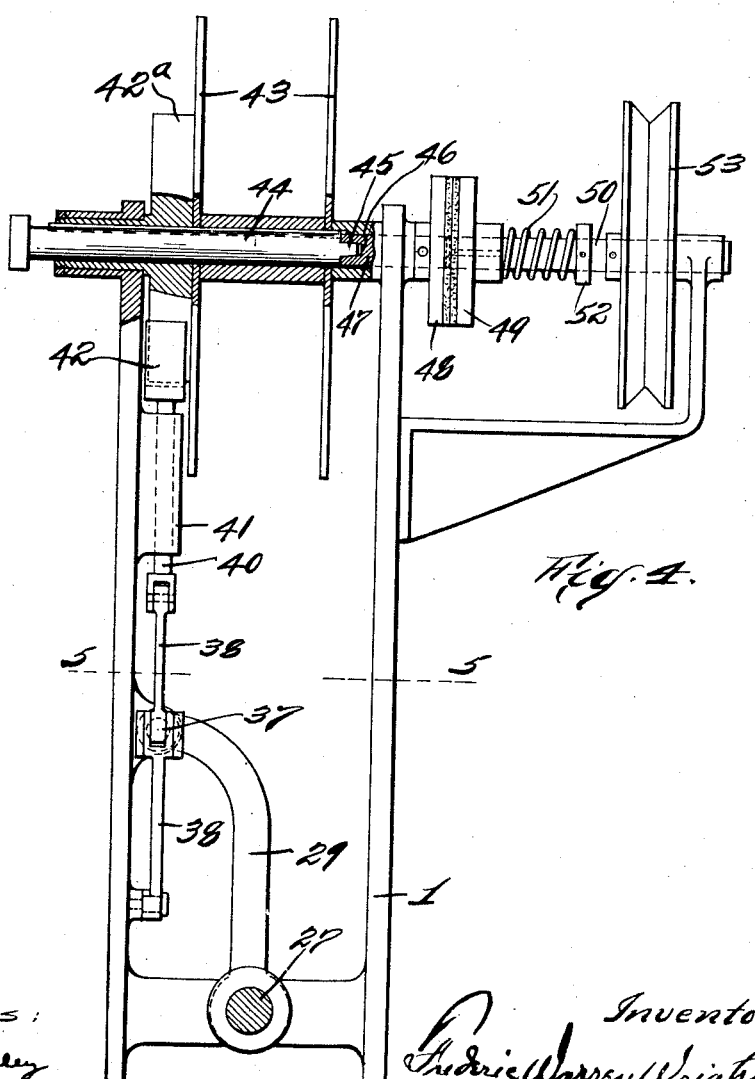

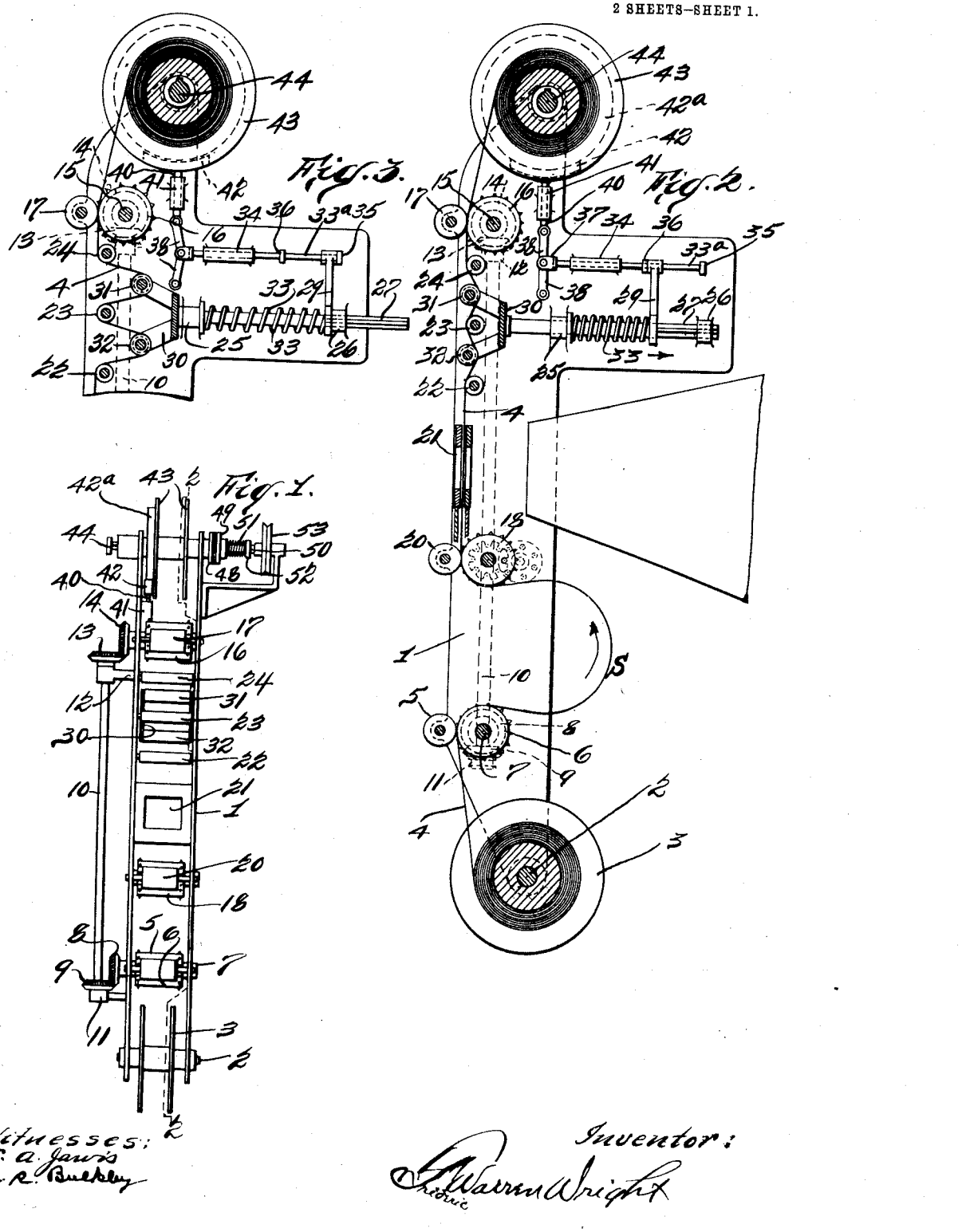

UNITED STATES PATENT OFFICE.

FREDERIC WARREN WRIGHT, OF YONKERS, NEW YORK.

PROJECTING-MACHINE FOR MOVING PICTURES.

1,024,661.  Specification of Letters Patent.  Patented Apr. 30, 1912.

Application filed November 18, 1911. Serial No. 661,149.

*To all whom it may concern:*

Be it known that I, FREDERIC WARREN WRIGHT, a citizen of the United States, residing at Yonkers, in the county of Westchester and State of New York, have invented certain new and useful Improvements in Projecting-Machines for Moving Pictures, of which the following is a clear, full, and exact description.

This invention relates to projecting machines for projecting moving pictures.

The object of the invention is to provide new and improved means for forming a loop between the delivery roll and the intermittent feed device, and for taking up slack more or less in the form of a loop between the intermittent feed device and the receiving reel, and the purpose of the invention is to control such slack by means of the receiving reel during its rotation, so that the slack is at all times maintained within certain limits, and governed by the receiving reel, irrespective of the speed of rotation or rather diameter of the coil of film being wound thereon.

In carrying out my invention, I provide means for forming a loop by an intermittently operated driving mechanism, between the delivery reel and the intermittent mechanism for feeding the film past the exposure aperture. I provided means for driving the intermittent loop forming mechanism, which is controlled by a sprocket and driven by its mesh, with the perforated film, so that as the film is pulled past the driving sprocket by the rotation of the receiving reel it will rotate the loop forming mechanism to advance the same. I provide means between the driving mechanism and the exposure aperture to take up and hold taut such slack as may be formed, and such take up mechanism I make use of as a controlling device for determining when the receiving reel shall be put into operation, and hence when a given amount of take-up has been accomplished, the take-up mechanism causes the receiving reel to rotate or rather controls it, so as to allow it to rotate, and upon its rotation it will operate the driving and driven sprockets for the loop forming mechanism. Upon all slack being taken up between the exposure aperture and the receiving reel, the take-up mechanism will automatically shut off or stop the further rotation of the receiving reel and the driving or driven sprockets for the loop forming mechanism.

Various different mechanical devices may be used to perform the functions described in the foregoing and illustrated in my drawings. In the embodiment of my invention shown and illustrated in this specification, I prefer that the receiving spool or reel be always under tension, tending to rotation, and that it be controlled by a brake operated by the take-up mechanism hereinbefore described, although this may be done in any number of ways.

The scope of my invention will be pointed out in the claims.

In the accompanying drawings: Figure 1 is a front elevation of the essential elements of my invention for application to a projecting machine. Fig. 2 is a section on line 2—2 Fig. 1. Fig. 3 is a view of the upper part of Fig. 2, showing the take-up mechanism as it is releasing the brake. Fig. 4 is an enlarged view partly in section of the driving mechanism for the take-up reel; and Fig. 5 is a section on line 5—5 Fig. 4.

As shown in the accompanying drawings, 1 is the frame carrying a shaft 2 near one end, on which is mounted the delivery reel 3. The film 4 from the delivery reel passes between an idler roller 5, and a sprocket roller 6, the teeth of the sprocket roller engaging the perforations of the film 4. The sprocket roller 6 is mounted on a shaft 7, on which is fastened a beveled gear 8 driven from a beveled gear 9 on a shaft 10, mounted in brackets 11—12, secured to the frame 1. A beveled gear 13 serves to turn the shaft 10 and is driven by a beveled gear 14 on a shaft 15, mounted in the frame and driven by a sprocketed roller 16 close to a plain idler roller 17, also mounted in the frame. On one side of the aperture (it is immaterial which side) I locate the ordinary sprocket wheel 18 with its intermittent moving mechanism 19 of the Geneva wheel variety, and adjacent to the sprocket 18 I provide an idler roller 20. This may be of the usual approved form of mechanism used in moving picture machines. As I have shown it, it constitutes the intermittent feed mechanism for pushing the film past the aperture. It may however pull the film past, in which event it may be on the opposite side of the aperture from that shown in the drawings.

21 indicates the exposure aperture of the projecting machine through which the film passes.

22, 23, and 24 are idle rollers, preferably placed in line one with the other, and above the exposure aperture between it and the driving sprocket roller 16.

Mounted in suitable lugs 25—26 in the frame is a shaft 27 carrying a vertical arm 29. At one end of the shaft is a bifurcated block 30, each bifurcation carrying a roller 31—32. A spring 33 tends always to move the bifurcated shaft in the direction of the arrow Fig. 2. A shaft 33 mounted in the bearings 34, and carrying two stops 35 and 36 is connected at 37 with a toggle lever having a link 38 connected to a vertical plunger 40, passing through a lug 41 on the frame, and carrying a brake wheel 42. The brake wheel 42, (see particularly Fig. 4) is mounted so as to turn with the receiving reel 43. A splined removable pin 44 unites the brake wheel with the receiving wheel and permits the removal of the wheel by a withdrawal of the pin. A tongue 45 on the end of the pin 44 fits into a socket 46 on a shaft 47, to one end of which shaft is a friction disk 48 adjacent to a friction disk 49 on the shaft 50. To insure a proper frictional grip of the friction surfaces of the disks 48 and 49 a spring 51 is provided between a collar 52 secured to the shaft 50, and the driving disk 49. A driving pulley 53 serves to drive the shaft 50 at all times during the operation of projecting; at other times the motor will be cut off.

In operating the machine, the delivery roll is first placed in position, the film drawn up past the sprocket roller 6, and the idle roller 5. A loop formed between that roller and intermittent driving mechanism, such loop being of greater length than the amount of slack which can be taken up by the bifurcated arm 30, up to the time that its arm 29 strikes the stop 35. The film is passed between the intermittent sprocket drive 18 and idle roller 20, before the exposure aperture, in front of the roller 22, behind the roller 32, in front of the roller 23, behind the roller 31, in front of the roller 24 and between the sprocket roll 16 and idle roll 17, from where it passes to and is wound on the receiving reel 43. In operation, the slack formed in the loop marked "S" as shown in Fig. 2 will be reduced as the frame is intermittently passed by the aperture until its reduction is equal to the amount pulled out as shown in Fig. 3 by the bifurcated arm, and its tension device, at which time the brake 42 will be released, the pulley 53 begin to rotate the receiving roll 43, pulling the film 4 past the sprocketed roller 16, and the idle roller 17, thus tending to draw out into a straight line the film between the intermittent driving mechanism and the sprocket roller 16, in doing which the bifurcated bracket or carriage will be returned to the position shown in Fig. 2, but the sprocket roller 16 and the sprocket roller 6 will have been in the meantime rotated, and a new loop S formed, ready for the next repetition of the operation. At the same time the bracket 29 will, when the devices have reached the position of Fig. 2, put on a brake and stop the further rotation of the receiving reel.

It will be noted that while the bifurcated bracket 30 is traveling from the position of Fig. 3 to the position of Fig. 2 that the intermittent feed mechanism is at the same time operating, tending to throw more slack upward, and hence the return of the carriage to the position of Fig. 2 from that of Fig. 3 will be much slower than the out-travel of the carriage.

In carrying out this invention, details of construction may be varied from those shown, and yet the essence of the invention be retained; some parts might be employed without others, and new features thereof might be combined with elements old in the art in diverse ways, although the herein described type is regarded as employing substantial improvements over such modifications.

As many changes could be made in the above construction, and many apparently widely different embodiments of the invention could be made without departing from the scope thereof, it is intended that all matter contained in the above description or shown in the accompanying drawings shall be interpreted in an illustrative and not in a limiting sense. It is furthermore desired to be understood that the language used in the following claims is intended to cover all the generic and specific features of the invention herein described, and all statements of the scope of the invention which as a matter of language might be said to fall therebetween.

I claim as my invention:

1. In a kinetoscope, mechanism for positively engaging the film to form a loop between the delivery reel and the exposure aperture, means for operating said mechanism controlled through the operation of the receiving reel, and dependent thereupon.

2. In a kinetoscope, mechanism for producing a loop between the aperture and the delivery reel, and means for intermittently operating said mechanism upon the diminishing of the size of the loop.

3. In a kinetoscope, means adapted to positively engage the film to form a loop between the exposure aperture and the delivery reel, intermittent mechanism for operating said loop-forming mechanism, and a controlling device for operating said mechanism from the receiving reel, said controlling device being in turn controlled by the amount of film which has passed the exposure aperture.

4. In a kinetoscope, means for forming a loop between the delivery mechanism and the aperture, said means being driven by the film itself, as it is wound on to the receiving reel, and means for intermittently operating the receiving reel.

5. In a kinetoscope, a sprocket roller for engaging the film to form a slack adjacent to the delivery reel, a sprocket roller engaged by the film and rotated thereby adjacent to the receiving reel, a controlling device securing its movement by the amount of slack formed between the aperture and the receiving reel, and adapted, upon a predetermined slack being obtained, to cause the actuation of the receiving reel.

6. In a kinetoscope, mechanism for producing a loop between the aperture and the delivery reel, and means for operating said mechanism upon the diminishing of the size of the loop.

7. In a kinetoscope, means adapted to positively engage the film to form a slack between the exposure aperture and the delivery reel, mechanism for operating said loop-forming mechanism, and a controlling device for operating said mechanism from the receiving reel, said controlling device being in turn controlled by the amount of film which has passed the exposure aperture.

8. In a kinetoscope, means for forming a loop between the delivery mechanism and the aperture, said means being driven by the film itself as it is wound on to the receiving reel, and means for operating the receiving reel.

Signed at New York city, New York this 15th day of November, 1911.

FREDERIC WARREN WRIGHT.

Witnesses:
  CHAS. ROSE,
  FRED FRANCIS WEISS.